United States Patent
Gurunathan et al.

(10) Patent No.: US 9,059,434 B2
(45) Date of Patent: Jun. 16, 2015

(54) STRUCTURE AND METHOD FOR SOFC OPERATION WITH FAILED CELL DIODE BYPASS

(75) Inventors: Ranganathan Gurunathan, Chennai (IN); Arne Ballantine, Palo Alto, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 1180 days.

(21) Appl. No.: 12/222,295

(22) Filed: Aug. 6, 2008

(65) Prior Publication Data

US 2010/0035092 A1 Feb. 11, 2010

(51) Int. Cl.
*H01M 8/02* (2006.01)
*H01M 8/24* (2006.01)

(52) U.S. Cl.
CPC .............. *H01M 8/0202* (2013.01); *H01M 8/02* (2013.01); *H01M 8/2425* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 5,964,309 A | 10/1999 | Kimura et al. | |
| 6,682,841 B1 * | 1/2004 | Armstrong et al. | 429/423 |
| 6,838,923 B2 | 1/2005 | Pearson | |
| 2002/0081471 A1 * | 6/2002 | Keegan et al. | 429/25 |
| 2003/0215689 A1 * | 11/2003 | Keegan | 429/35 |
| 2005/0129988 A1 * | 6/2005 | Knights et al. | 429/7 |
| 2005/0271906 A1 * | 12/2005 | Murphy | 429/12 |
| 2006/0127710 A1 * | 6/2006 | Schulte | 429/13 |
| 2006/0147769 A1 * | 7/2006 | Murphy et al. | 429/23 |
| 2006/0210858 A1 * | 9/2006 | Warrier et al. | 429/32 |
| 2007/0141423 A1 * | 6/2007 | Suzuki et al. | 429/31 |
| 2008/0187802 A1 * | 8/2008 | Andreas-Schott et al. | 429/24 |
| 2010/0209802 A1 | 8/2010 | Armstrong et al. | |

FOREIGN PATENT DOCUMENTS

| | | |
|---|---|---|
| JP | 11329457 | 11/1999 |
| WO | 0049673 | 8/2000 |
| WO | 200245197 A2 | 6/2002 |
| WO | 2007056518 A2 | 5/2007 |

OTHER PUBLICATIONS

Vescan, A. et al; Very High Temperature Operation of Diamond Schottky Diode; IEEE Electron Device Letters, vol. 18, No. 11, Nov. 1997.*
Vescan, A. et al (Very High Temperature Operation of Diamond Schottky Diode).*
Solid Oxide Fuel Cells, Earnest Garrison, available at http://mypages.lit.edu/~smart/garrear/fuelcells.htm, last visited Jun. 30, 2013.*
A. Vescan et al., "Very High Temperature Operation of Diamond Schottky Diode," Electron Device Letters, IEEE, 18 (11): 556-558, 1997.

\* cited by examiner

*Primary Examiner* — Ula C Ruddock
*Assistant Examiner* — Scott J Chmielecki
(74) *Attorney, Agent, or Firm* — The Marbury Law Group PLLC

(57) ABSTRACT

A fuel cell system includes a fuel cell stack which includes a plurality of fuel cells contacted in series by a plurality of interconnect plates. At least two interconnect plates are contacted by a high-temperature bypass diode that is physically integrated in the fuel cell stack.

15 Claims, 2 Drawing Sheets

STRUCTURE AND METHOD FOR SOFC OPERATION WITH FAILED CELL DIODE BYPASS

BACKGROUND OF THE INVENTION

The present invention relates generally to fuel cell systems and more particularly to fuel cell systems containing an integrated high-temperature bypass diode.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air has to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

When a fuel cell fails, it becomes highly resistive. In the case of a SOFC stack, operation of the stack may continue, but the voltage of the stack is increasingly consumed by the voltage drop across the resistive interface formed by the failed cell. Bypass diodes have been used in fuel cell systems to allow current to bypass the defective fuel cell, but these diodes have been located outside of the fuel cell block. In particular, to avoid chemical and thermal degradation of the diodes, the diodes have been located outside of the hot box portion of the system that operates at a temperature greater than about 600° C. Jumper wiring has been used to connect the fuel cells to the diodes located outside the fuel cell block.

SUMMARY OF THE INVENTION

One aspect of the invention provides a fuel cell stack comprising a plurality of fuel cells contacted in series by a plurality of interconnect plates and a high-temperature bypass diode which is physically integrated in the fuel cell stack.

Another aspect of the invention provides a fuel cell system, comprising a fuel cell block which, during normal operation, operates at a temperature of at least 600° C. At least one fuel cell is located between at least two interconnect plates located in the fuel cell block. A high-temperature bypass diode is electrically connected to the at least two interconnect plates. The diode is located inside the fuel cell block.

DETAILED DESCRIPTION OF THE PREFERRED EMBODIMENTS

Figure 1:
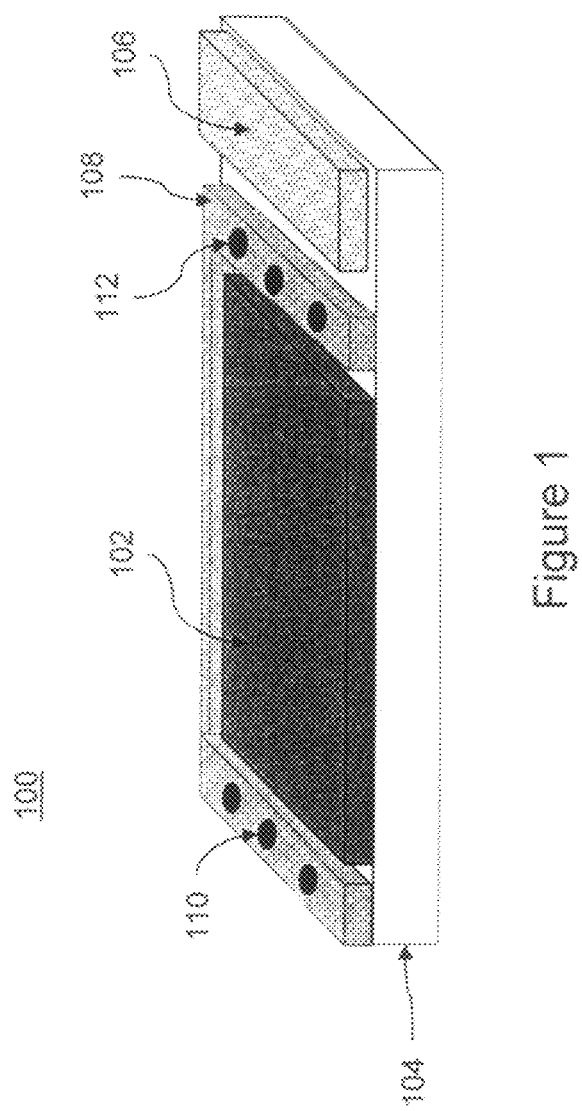
FIG. 1 is a three-dimensional cross-sectional view of a fuel cell stack with a diode structure for current bypass.

FIG. 1 shows a repeating unit 100 of a fuel cell stack. The unit 100 includes a fuel cell 102 and an interconnect plate 104. The fuel cell stack is formed by stacking more than one repeating unit 100 on top of each other such that a plurality of fuel cells 102 are connected in series by a plurality of interconnect plates 104. While a vertically oriented stack may be formed by stacking the unit 100 shown in FIG. 1, the unit 100 may be oriented and stacked horizontally or in any other suitable direction between vertical and horizontal. In FIG. 1, the diode 106 is located inside a fuel cell block of the system. The fuel cell block is the hot zone of the system, which, during normal operation, operates at a high temperature, such as a temperature of about 600° C. or more. The fuel cell block includes a hot box in which an air exhaust conduit and a fuel exhaust conduit are located.

The term "fuel cell stack," as used herein, means a plurality of stacked fuel cells which share a common fuel inlet and exhaust passages or risers. The "fuel cell stack," as used herein, includes a distinct electrical entity which contains two end plates on opposite ends of the stack which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, plural stacks may share the same end plates. In this case, the stacks jointly comprise a distinct electrical entity.

Figure 2:
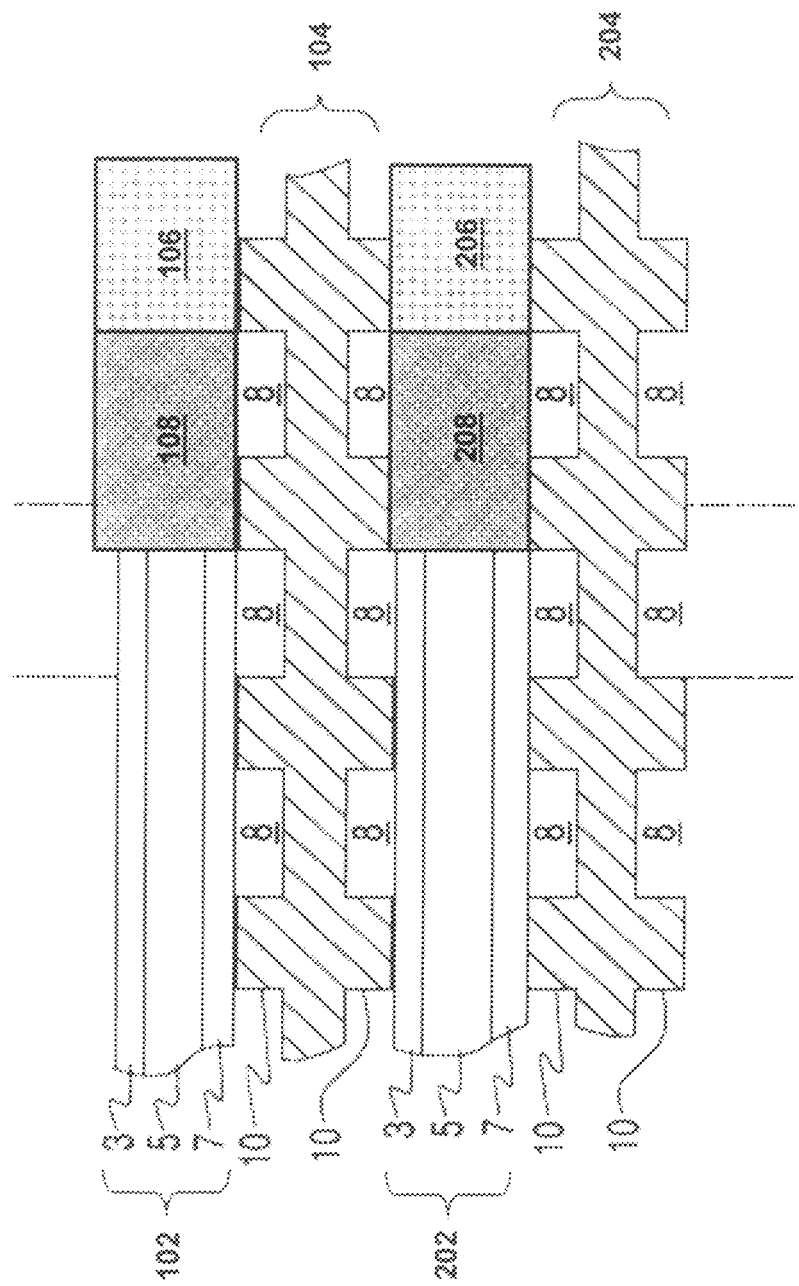
FIG. 2 is a two-dimensional cross-sectional view of a fuel cell stack with a diode structure for current bypass.

As shown in FIG. 2, the fuel cell 102 includes an anode electrode 7, a solid oxide electrolyte 5, and a cathode electrode 3. The anode electrode may comprise a cermet comprising a nickel containing phase and a ceramic phase. The nickel containing phase preferably consists entirely of nickel in a reduced state. This phase forms nickel oxide when it is in an oxidized state. Thus, the anode electrode is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria. The electrolyte may comprise a stabilized zirconia, such as scandia stabilized zirconia (SSZ) or yttria stabilized zirconia (YSZ). Alternatively, the electrolyte may comprise another ionically conductive material, such as a doped ceria. The cathode electrode may comprise an electrically conductive material, such as an electrically conductive perovskite material, such as lanthanum strontium manganite (LSM). Other conductive perovskites, such as LSCo, etc., or metals, such as Pt, may also be used. The cathode electrode may also contain a ceramic phase similar to the anode electrode. The electrodes and the electrolyte may each comprise one or more sublayers of one or more of the above described materials.

The interconnect plate 104 separates the individual cells 102, 202 in the stack. The interconnect plate 104 separates fuel, such as a hydrogen and/or a hydrocarbon fuel, flowing to the anode (fuel) electrode of one cell in the stack, from oxidant, such as air, flowing to the cathode (air) electrode of an adjacent cell in the stack. As shown in FIG. 2, the interconnect plate 104 contains gas flow passages or channels 8 between ribs 10. The interconnect plate is also used to electrically connect the anode (fuel) electrode 7 of one cell 102 to the cathode (air) electrode 3 of an adjacent cell 202, thereby electrically connecting the cells in series. The interconnect plate may be made of or may contain electrically conductive material, such as a metal alloy (e.g., chromium-iron alloy) or an electrically conductive ceramic material, which optionally has a similar coefficient of thermal expansion to that of the electrolyte in the cells 102, 202. An electrically conductive contact layer, such as a nickel contact layer, may be provided between the anode electrode and the interconnect. Another optional electrically conductive contact layer may be provided between the cathode electrode and the interconnect.

As shown in FIG. 2, the high-temperature bypass diode 206 is physically integrated in the fuel cell stack. The diode 206 is physically contacted by a first interconnect plate 104 and is also physically contacted by a second interconnect plate 204 of an adjacent repeating unit shown in FIG. 2. For example, the first interconnect plate 104 contacts the diode 206 on a first diode surface and the second interconnect plate 204 contacts the diode 206 on a second diode surface opposite the first diode surface. The diode 206 is sandwiched between the first and second interconnect plates 104, 204. The diodes 106, 206 can have a thickness that is substantially equal to a thickness of each cell 102, 202, such that the first and second interconnect plates 104, 204 evenly contact each diode 106, 206 and each cell 102, 202. To match the thickness of the diode and cell, the diode 106 may comprise multiple layers, such as one or more conductive electrode layers on one or both sides of the diode 106. These layers are understood to be part of the diode 106. In an embodiment, the first or second interconnect plate, or both plates, may further comprise a contact layer in physical contact with both the fuel cell 102 and the diode 106. In that case, the contact layer is understood to be part of the interconnect plate. Because the diode 106 is in physical contact with the interconnect plates 104, 204, jumper wires are not needed to electrically connect the diode 106 with the plates 104, 204.

The first and second interconnect plates are, during normal operation, in electrical contact with the fuel cell 102, and an electrical current flows through the cell 102 towards the adjacent unit. During normal operation, the voltage generated by the fuel cell holds the diode 106 in reverse bias and the diode 106 will effectively be an open circuit. If the cell 102 becomes defective, the cell 102 becomes highly resistive and a voltage drop is formed across the defective cell. The voltage drop may be about 0.5 V to about 15 V, such as about 1 V to about 5 V. When this voltage drop exceeds a threshold voltage of the diode 106 (such as an "on" voltage of the diode), the diode 106 is placed into forward bias and conducts current in at least one direction between the first and second interconnect plates. The threshold voltage of the diode 106 can be arbitrarily selected depending on the diode used. For example, the threshold voltage may be about 0.5 V to about 3 V, such as about 1 V. Preferably, the diode is oriented such that the direction of the bypass current is the same as that of a non-defective cell during normal operation. In other words, the bypass direction of the diode 106 is the same direction of current flow as that of a non-defective cell.

The diode 106 may be any passive or active electrical device which is capable of conducting electricity between at least two interconnects when at least one fuel cell becomes defective. Preferably, the diode 106 does not conduct an appreciable amount of current in the reverse bias direction when the cells are not defective. Preferably, the diode 106 is capable of operating at high temperatures within the fuel cell block, such as about 600-1000° C. Diamond semiconductor diodes are examples of diodes which can operate with junction temperatures of up to about 1000° C. For example, the diodes disclosed by A. Vescan et al., "Very high temperature operation of diamond Schottky diode," *Electron. Device Letters, IEEE,* 18(11): 556-558 (1997), which is incorporated herein by reference in its entirety, may be used. Silicon carbide semiconductor diodes may also be used.

The diode 106 may be located in the interior of the fuel cell stack such that no portion of the diode is located outside of an imaginary boundary defined by the outer edges of the first or second interconnect plates when the stack is viewed along its longitudinal axis. For a plate-like SOFC stack, the longitudinal axis is perpendicular to a major surface of an interconnect plate, and the diode 106 would be entirely obscured by one or more interconnect plates when viewing the stack along this axis.

The interconnect plate 104 includes inlet riser openings 110 which distribute fuel to the interconnect channels 8. Outlet riser openings 112 collect the fuel or fuel exhaust from the channels and provide it to a fuel outlet. On the side of the interconnect plate opposite these fuel channels (i.e., the air side), a seal 108 surrounding the risers 110, 112 is provided to avoid mixing of fuel and air within the stack. The diode 106 may be located in close physical proximity to the seal 108. As shown in FIG. 1, the seal 108 separates the diode 106 from the cell 102. Alternatively, both the diode 106 and the cell 102 may be located on the same side of the seal 108. In another embodiment, the same or different seal may be placed around a perimeter of the diode 106 to prevent SOFC process gases from causing degradation of the diode by oxidation or reduction.

The diode 106 may be located at least partially around the perimeter of at least one fuel cell, such as at least partially around the perimeter of the unit 100. Optionally, the diode 106 is located fully around the perimeter of a given cell 102 or a given interconnect 104. Although the diode 106 in FIG. 1 is shown to be located on the major surface of the interconnect 104, in other embodiments the diode may be located on the minor surface of the interconnect 104. For example, the diode 104 may contact the interconnect 104 on a minor surface comprising a thickness of the interconnect 104. The diode 106 may be placed around, or span across, a plurality of repeating units 100, such as two to ten units, for example about five units. A further alternative is to provide the diode 106 only for cells which have a high probability of failure, such as end cells. In that case, the fuel cell 102 comprises an end cell (i.e., the last cell at one end of the stack), and either the first or second interconnect plate comprises an end plate.

In another embodiment, the diode 106 is located inside a fuel cell block of the system but does not physically contact the unit 100. For example, the diode may be in electrical contact with the interconnect plate 104 via jumper wires. In this case, the diode may still be located in the hot box operating at temperatures greater than 600° C.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A fuel cell system, comprising:
    a fuel cell block comprising a portion of the system which, during normal operation, operates at a temperature of at least 600° C.;
    a fuel cell stack comprising at least one fuel cell located between at least two interconnect plates located in the fuel cell block; and
    a high-temperature bypass diode electrically connected to the at least two interconnect plates,
    a first seal surrounding a fuel riser opening which extends through an at least two interconnect plates;
    wherein the diode comprises a perimeter which circumscribes the diode and wherein the diode is located inside the fuel cell block, wherein the first seal or a different second seal surrounds the perimeter of the diode, and wherein the first seal or the second seal separates the diode from the fuel riser opening.

2. The fuel cell system of claim 1, wherein the diode is capable of conducting electricity in at least one direction between the at least two interconnect plates if the at least one fuel cell becomes defective.

3. The fuel cell system of claim 2, wherein the fuel cell block further comprises a hot box in which an air exhaust conduit and a fuel exhaust conduit are located.

4. The fuel cell system of claim 3, wherein the diode is in physical contact with the at least two interconnect plates.

5. The fuel cell system of claim 3, wherein the diode is located in the interior of the fuel cell stack in a space located between adjacent first and second interconnect plates and the seal which separates the fuel cell from the diode, such that the diode does not extend beyond the outer edges of the interconnect plates.

6. The fuel cell system of claim 3, wherein the diode is located at least partially around the perimeter of the at least one fuel cell.

7. The fuel cell system of claim 6, wherein the diode is located fully around the perimeter of the at least one fuel cell.

8. The fuel cell system of claim 3, wherein the diode comprises a diamond or silicon carbide semiconductor diode.

9. The fuel cell system of claim 3, wherein the at least one fuel cell comprises an end cell and at least one of the at least two interconnect plates comprises an end plate.

10. The fuel cell system of claim 3, wherein the diode is located between the at least two interconnect plates and has a thickness which is substantially equal to a thickness of the at least one fuel cell.

11. The fuel cell system of claim 1, wherein the fuel cell stack is externally manifolded for air.

12. The fuel cell system of claim 1, wherein the first seal surrounds the perimeter of the diode, and wherein the first seal separates the diode from the fuel riser opening.

13. The fuel cell system of claim 12, wherein the first seal separates the diode from the at least one fuel cell.

14. The fuel cell system of claim 1, wherein the second seal surrounds the perimeter of the diode, and wherein the second seal separates the diode from the fuel riser opening.

15. The fuel cell system of claim 14, wherein the second seal separates the diode from the at least one fuel cell.

* * * * *